(12) United States Patent
Chen (10) Patent No.: US 8,959,327 B2
(45) Date of Patent: Feb. 17, 2015

(54) METHOD AND SYSTEM FOR AN ARCHITECTURE OF DCR DTV RECEIVER SOC WITH EMBEDDED REPROGRAMMABLE SECURITY

(76) Inventor: Xuemin Chen, San Diego, CA (US)

( * ) Notice: Subject to any disclaimer, the term of this patent is extended or adjusted under 35 U.S.C. 154(b) by 1417 days.

(21) Appl. No.: 11/741,105

(22) Filed: Apr. 27, 2007

(65) Prior Publication Data

US 2008/0266464 A1 Oct. 30, 2008

(51) Int. Cl.
*G06F 7/04* (2006.01)
*G06F 17/30* (2006.01)
*G06F 1/24* (2006.01)
*H04N 7/16* (2011.01)
*H04N 7/167* (2011.01)
*H04N 21/418* (2011.01)
*H04N 21/4623* (2011.01)
*H04N 5/44* (2011.01)

(52) U.S. Cl.
CPC ........... *H04N 7/165* (2013.01); *H04N 21/4183* (2013.01); *H04N 21/4623* (2013.01); *H04N 5/4401* (2013.01)
USPC ................... 713/100; 713/187; 726/2; 726/9; 380/2; 725/25; 725/31; 725/151; 725/152

(58) Field of Classification Search
USPC ........... 725/25, 31, 151, 152; 726/2, 9; 380/2; 713/100, 187
See application file for complete search history.

(56) References Cited

U.S. PATENT DOCUMENTS

| | | | |
|---|---|---|---|
| 7,398,544 B2 * | 7/2008 | Candelore et al. | 726/2 |
| 2004/0190721 A1 * | 9/2004 | Barrett et al. | 380/277 |
| 2004/0221324 A1 * | 11/2004 | Ansari et al. | 725/140 |
| 2006/0272022 A1 * | 11/2006 | Loukianov et al. | 726/26 |
| 2007/0028260 A1 * | 2/2007 | Williams et al. | 725/31 |
| 2007/0143862 A1 * | 6/2007 | Kim | 726/31 |
| 2007/0174621 A1 * | 7/2007 | Ducharme | 713/176 |
| 2008/0098212 A1 * | 4/2008 | Helms et al. | 713/155 |
| 2008/0240230 A1 * | 10/2008 | Oxman et al. | 375/240.01 |

* cited by examiner

*Primary Examiner* — Nasser Goodarzi
*Assistant Examiner* — Kyu Chae
(74) *Attorney, Agent, or Firm* — Sterne, Kessler, Goldstein & Fox P.L.L.C.

(57) ABSTRACT

A security processor may be embedded within a digital cable ready (DCR) digital TV (DTV) system-on-chip to performing content protection operations during digital TV signal processing. The embedded security processor may be used to perform operations that are currently performed by an external entity, such as, for an example, a CableCard. The embedded security processor maybe configured to use a conditional access function including, but not limited to, CableLabs® Downloadable Conditional Access System (DCAS) based function. The security processor may be reprogrammable to enable the system-on-chip to be reconfigured with a different function and/or to allow operation with a new cable service provider. The security processor may enable secure reprogrammability of the system-on-chip utilizing security algorithms and/or other mechanisms including use of chip-specific identification information. The SoC may be enabled to operate with a CableCard whenever the security processor may be disabled.

39 Claims, 11 Drawing Sheets

METHOD AND SYSTEM FOR AN ARCHITECTURE OF DCR DTV RECEIVER SOC WITH EMBEDDED REPROGRAMMABLE SECURITY

CROSS-REFERENCE TO RELATED APPLICATIONS/INCORPORATION BY REFERENCE

[Not Applicable].

FIELD OF THE INVENTION

Certain embodiments of the invention relate to Digital Television (DTV). More specifically, certain embodiments of the invention relate to a method and system for a secure reprogrammable system-on-a-chip (SoC) for a digital cable ready (DCR) Digital Television (DTV) receiver.

BACKGROUND OF THE INVENTION

Digital Television (DTV) has gained increased popularity in recent years; more and more service providers transitioned, and/or are transitioning, from providing analog-based services to digital-based ones.

In most DTV services, the DTV receivers need to include "content protection" technologies, for example, Conditional Access Receiver, Digital Right Management (DRM) for copy-protection. To satisfy such need, a lot of operators provide their customers with set-top boxes that incorporate functionality to account for such content protection application. However, there has been a push toward moving away from such requirement for set-top box, and toward Digital Cable Ready (DCR) DTV. With the DCR DTV, the Digital TV set would simply plug into a cable jack, and thus the operator network, and would be able to function without set-top box.

In order to help smooth the transition to DTV for millions of users, The Federal Communications Commission (FCC) has adopted "plug-and-play" rules to ensure that most cable systems are compatible with DTV receivers and related consumer electronics equipment. This is crucial toward building products, developing services and maintaining a market-friendly environment for HDTV. The cable plug-and-play rules are important to the DTV transition because they facilitate direct connection of digital navigation devices or customer premises equipment, such as Television receivers, set-top boxes, and digital recorders that are purchased from retail outlets to cable Television systems. These "plug-and-play" capabilities are generally aimed at promoting "integrated" DTV products, that is, Digital TV sets that may run without use of actual set-top box. The users may simply plug such integrated Digital TV set into their cable jack and, using a security module, called CableCard, provided by the cable operator, receive DTV programming and related services. From a security point of view, CableCard removes the conditional access of the DTV programming and re-scramble the programming by using a standard copy-protection mechanism.

While the use of CableCard permits forgoing of use of physical set-top boxes, it also has draw backs of its own. CableCard devices are generally expensive, and the burden of costs would have to be borne by either the providers or the customers. Furthermore, the CableCard solution is inflexible because providers would require different and unique CableCard devices that is specifically configured to these providers' content protection technologies. Therefore, whenever a customer changes providers, or even in some situations where a provider may change their content protection technologies, the CableCard devices in current use may need to be replaced. Other approaches to satisfy the FCC's "plug-and-play" rules are considered because of the potential limitations and issues related to use of CableCard.

One new approach is to develop a downloadable conditional access (CA) function (DCAS) as described in <http://www.opencable.com/dcas/> by major US cable operators. DCAS proposes a cost-effective, network-agnostic solution for interactive two-way devices that connect to cable systems, allowing cable operators to download their conditional access (CA) function(s) of choice to devices connected to the cable network. However, DCAS also has its limitations. Because DCAS is aimed at allowing cable providers to change content protection technologies, a considerable control by the cable-operator at the head-end side would be requires. In other words, the product using the DCAS must be configured to work specifically with a specific cable-operator. Therefore, while the DCAS may be ideal for products that still use set-top boxes, it may not be practical for "integrated" Digital TV sets because it would require these sets to be designed specifically to conform to a certain set of content protection technologies. In other words, DCAS requires very restricted production processes which are specified by the cable industry, and these processes may not be suitable to the DTV production process because DTV manufacturers may not want to have their DTV SoC be limited by specific cable provider.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a secure reprogrammable system-on-a-chip (SoC) for a digital cable ready (DCR) Digital Television (DTV) receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a secure reprogrammable system-on-a-chip (SoC) for a digital cable ready (DCR) Digital Television (DTV) receiver. A security processor may be embedded within a digital cable ready (DCR) digital TV (DTV) system-on-chip to perform content protection operations during digital TV signal processing. The embedded security processor may be used to perform operations that are currently performed by an external entity, such as, for an example, a CableCard. The embedded security processor may be configured to use a conditional access function including, but not limited to, CableLabs® Downloadable Conditional Access System (DCAS) based function. The security processor may be reprogrammable to enable the system-on-chip to be reconfigured with a different function and/or to allow operation with a new cable service provider. The security processor need be certified with certain security level to satisfy the robustness rules specified by service providers or the protection profile specified by a security standard to facilitated secure operations and reprogramming; subsequently, the security processor may enable secure reprogramming of the system-on-chip utilizing security algorithms and/or other mechanisms comprising use of chip-specific identification information. The SoC may be enabled to operate with a CableCard in instances when the security processor is disabled.

Figure 1A:
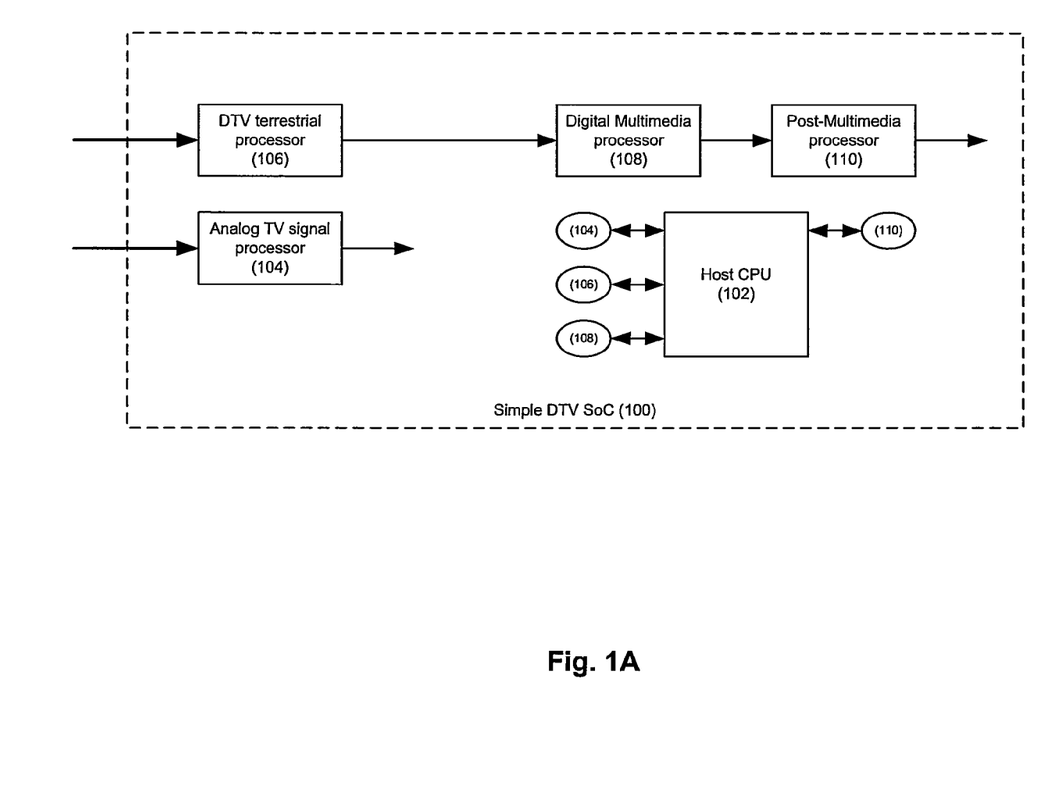
FIG. 1A is a block diagram illustrating an exemplary simple Digital Television (DTV) receiver System-on-Chip (SoC), in connection with an embodiment of the invention.

FIG. 1A is a block diagram illustrating an exemplary simple Digital Television (DTV) receiver System-on-Chip (SoC), in connection with an embodiment of the invention. Referring to FIG. 1A, there is shown a DTV SoC 100, a host CPU 102, an analog signal processor 104, a DTV terrestrial processor 106, a digital multimedia processor 108, and a post-multimedia processor 110, in connection with an embodiment of the invention.

The DTV SoC 100 may comprise a host CPU 102, an analog signal processor 104, a DTV terrestrial processor 106, a digital multimedia processor 108, and a post-multimedia processor 110, and suitable logic, circuitry and/or code that may enable reception and processing operations of TV signals. The host CPU 102 may comprise suitable logic, circuitry and/or code that may enable various processing operations. The invention may not be limited to a specific processor, but may comprise for example, a general purpose processor, a specialized processor or any combination of suitable hardware, firmware, software and/or code, which may be enabled to provide secure reprogrammability of system-on-chip. The host CPU 102 may configure and control various other processors in the DTV SoC 300 including, but not limited to, the analog signal processor 104, the DTV terrestrial processor 106, the digital multimedia processor 108, and the post-multimedia processor 110.

The analog TV signal processor 104 may comprise suitable logic, circuitry and/or code that may enable processing of an analog TV signal. The invention is not limited to a specific type of analog TV signal, but may comprise for example NTSC or PAL signal processor. The DTV terrestrial processor 106 may comprise suitable logic, circuitry and/or code that may enable processing of a terrestrial DTV signal. The invention is not limited to a specific type of DTV signal, but may comprise for example VSB ATSC signal processor. The digital multimedia processor 108 may comprise suitable logic, circuitry and/or code that may enable performing digital transport processing. The invention is not limited to a specific type of digital transport processing, but may comprise for example MPEG-2 multimedia processing, MPEG-2 video decoder, Dolby Digital (AC3) decoder . . . etc. The post-multimedia processor 110 may comprise suitable logic, circuitry and/or code that may enable performing digital audio and video processing to facilitate suitable output signals within a Digital TV set.

In operation, the host CPU 102 may perform various general processing operations including, but not limited to, configuring and controlling various other processors in the DTV SoC 300 which may include the analog signal processor 104, the DTV terrestrial processor 106, the digital multimedia processor 108, and the post-multimedia processor 110. The analog TV processor 104 may perform process analog TV signals. This may include performing demodulation, and A/D (analog/digital) conversion, decoding composite video to digital components, BTSC stereo decoding, and other types of operations. The analog TV signal processor 104 ensures that the DTV SoC (and the Digital TV set in general) is backward compatible. In instances where an analog TV signal may be received, the analog TV signal processor 104 may perform necessary processing operation on the signal to ensure that it may be displayed. The analog TV signal processor may be configured and controlled by the host CPU during such operation.

The DTV terrestrial processor 106 may process DTV signal received over terrestrial link. The DTV terrestrial processor 106 may be enabled to perform such operations as RF conversion, signal demodulation, de-interleaving, decoding, an other operations, according to pre-determined standard such as, for example, VSB and ATSC. The DTV terrestrial processor 106 may produce a digital transport stream that corresponds to the received DTV signal. The resulting transport stream may be sent to the digital multimedia processor 108.

The digital multimedia processor 108 may perform digital transport processing. This may comprise extracting the digital and audio content of the digital transport stream and perform necessary decoding processing on the video and/or audio content of the digital transport stream. Once the video and audio digital contents are decoded, the post-multimedia processor 110 may perform any necessary processing to ensure that the video and audio contents may be output via a Digital TV set.

Figure 1B:
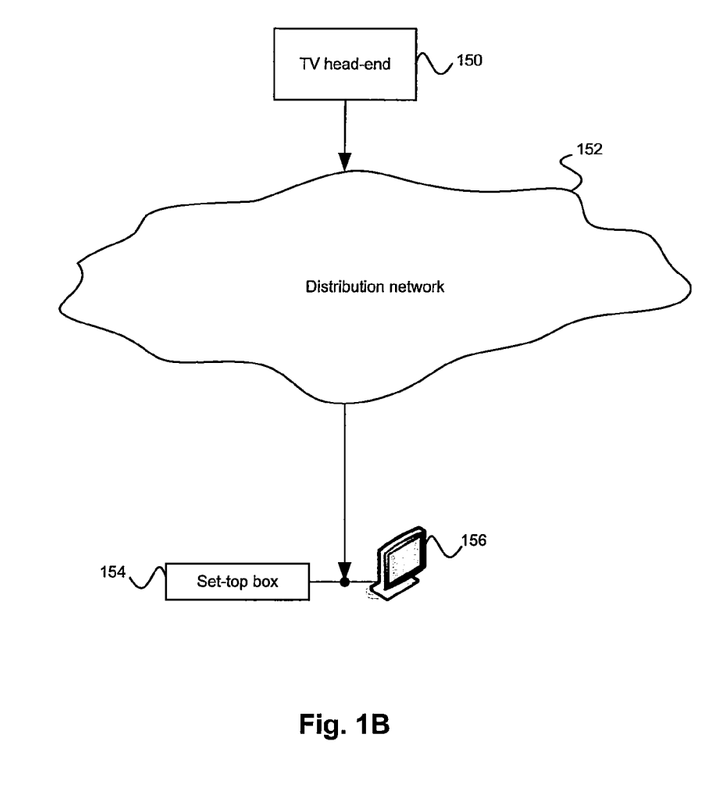
FIG. 1B is a block diagram illustrating a TV network utilizing a simple Digital TV (DTV) set, in connection with an embodiment of the invention.

FIG. 2B is a block diagram illustrating a TV network utilizing a simple Digital TV (DTV) set, in connection with an embodiment of the invention. Referring to FIG. 1B, there is shown a TV head-end 150, a distribution network 152, a set-top box 154, and a Digital Television (DTV) set 156.

The TV head-end 150 may comprise suitable hardware and/or software that may enable TV signal transmission and communication, via one or more distribution networks such as the distribution network 152. The TV head-end 150 may transmit an analog or digital TV signal. The distribution network 152 may comprise suitable distribution system that may enable communication between the TV head-end 150 and the set-top box 154 and/or the Digital TV set 156. The set-top box 154 may comprise suitable hardware and/or software that may enable processing DTV transmission from a TV head-end 150 transmitting encrypted digital TV signals with some content protection technology. The Digital TV set 156 may comprise suitable hardware and/or software that may enable outputting TV video and audio. The Digital TV set 156 may comprise the DTV SoC 100.

In operation, the TV head-end 150 may communicate with the distribution network 152 to transmit TV signals. The transmitted signal may be a digital TV signal, and may be subject to some content protection technologies. The distribution network 152 may transmit the DTV signals to the set-top box 154 and/or the Digital TV set 156. In the instance that the TV head-end is transmitting analog signal, or un-encrypted digital signal, the signal may be transmitted directly into the Digital TV set 156. Alternatively, in instances when the TV head-end may be transmitting encrypted digital TV signal, the set-top box 154 may decrypt the received DTV signal by applying proper content protection operations. The set-top box may be pre-configured or configured to apply content protection operations that are specific to a service provider. The Digital TV set 156 may process the signal either received directly from the distribution network 152, or from the set-top box 154. The Digital TV set 156 may utilize the DTV SoC 100 in order to output the corresponding video and audio components of the received DTV signal.

Figure 2A:
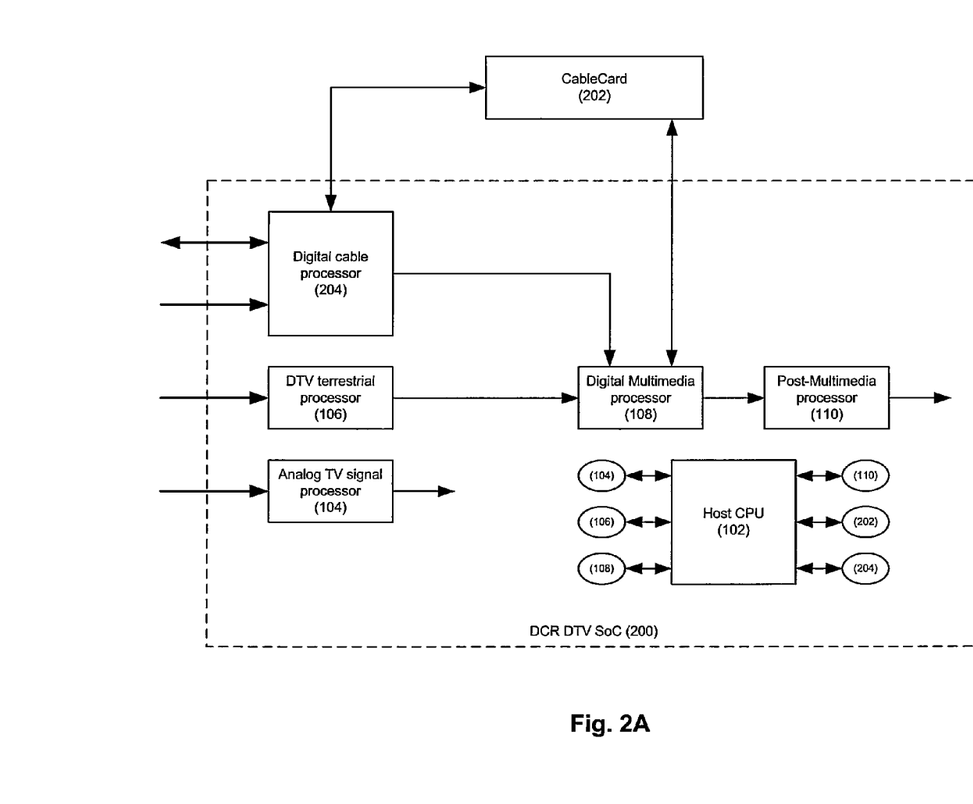
FIG. 2A is a block diagram illustrating an exemplary Digital Cable Ready (DCR) Digital Television (DTV) receiver System-on-Chip (SoC), in connection with an embodiment of the invention.

FIG. 2A is a block diagram illustrating an exemplary Digital Cable Ready (DCR) Digital Television (DTV) receiver System-on-Chip (SoC), in connection with an embodiment of the invention. Referring to FIG. 2A, there is shown a DTV SoC 200, a host CPU 102, an analog signal processor 104, a DTV terrestrial processor 106, a digital multimedia processor 108, and a post-multimedia processor 110, a digital cable processor 204, and a CableCard 202.

The DCR DTV SoC 200 may comprise the host CPU 102, the analog signal processor, a DTV terrestrial processor 106, the digital multimedia processor 108, and the post-multimedia processor 110, as disclosed in FIG. 1A. The DCR DTV SoC 200 may also comprise a digital cable processor 204, and suitable logic, circuitry and/or code that may enable reception and processing operations of TV signals. The digital cable processor 204 may comprise suitable logic, circuitry and/or code that may enable one-way and/or two-way communication with cable-TV head-end 150. The digital cable processor may comprise a QAM receiver that receives QAM analog signal centered at the standard TV IF frequencies, amplifies and digitizes this signal with a gain amplifier and A/D converter. The digital receiver demodulates, matched filters and then filters the signal to remove multi-path propagation effects and narrowband inter-channel interface. The trellis code and Reed-Solomon code decoders may support ITU-T J.83 Annex A/B/C standard. The digital cable processor 204 may also comprise Out-Of-Band QPSK receiver that may digitize the IF signal and demodulate the signal with recovered clock and carrier timing, filters and equalize the data and may also include a forward error-correction (FEC) decoder. The digital cable processor 204 may also comprise a QPSK transmitter for two-way cable communications. The CableCard 202 may comprise suitable hardware and/or software that may enable processing DTV transmission applying necessary content protection operations.

In operation, the digital cable processor 204 may process a digital cable signal. The control processor may process the received signal when necessary transmit. Where necessary, the digital cable processor 204 may utilize the CableCard to decrypt the received signal by applying proper content protection applications. The CableCard 202 may be pre-configured or configured to apply content protection operations that are specific to a cable-operator. The CableCard 202 may interact with the digital multimedia processor 108 to ensure that the encrypted signal was decrypted and may be processed by the digital multimedia processor 108. The host CPU 102 may additionally configure and control the CableCard 202, and the digital cable processor 202. Subsequently, the final transport stream may be sent to the digital multimedia processor 108, wherein the signal may be processed as disclosed in FIG. 1A.

Figure 2B:
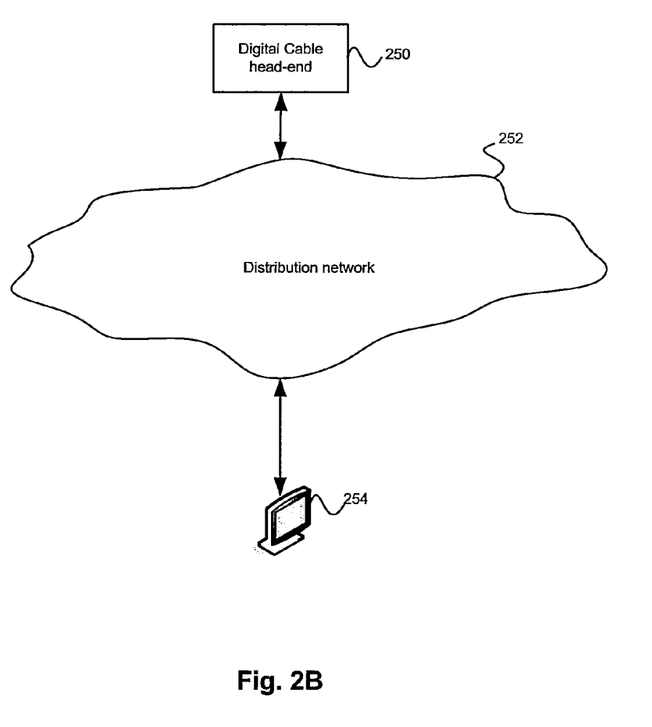
FIG. 2B is a block diagram illustrating a digital cable-TV network utilizing a Digital Cable Ready (DCR) Digital TV (DTV) set, in connection with an embodiment of the invention.

FIG. 2B is a block diagram illustrating a digital cable network utilizing a Digital Cable Ready (DCR) Digital TV (DTV) set, in connection with an embodiment of the invention. Referring to FIG. 2B, there is shown a digital cable head-end 250, the distribution network 252, and a Digital Cable Ready (DCR) Digital Television (DTV) set 254.

The digital cable head-end 250 may comprise suitable hardware and/or software that may enable digital cable signal transmission and communication, via one or more distribution networks such as the distribution network 252. The distribution network 252 may comprise suitable distribution system that may enable communication between digital cable head-end 250 and the DCR DTV 254. The DCR Digital TV set 254 may comprise suitable hardware and/or software that may enable processing DTV signals, including digital cable. The DCR Digital TV set 254 may comprise the DCR DTV SoC 200.

In operation, the digital cable head-end 250 may communicate with the distribution network 252 to transmit digital cable signals. The transmitted signal may be subject to some content protection technologies. The distribution network 252 may transmit the signals to DCR Digital TV set 254. The DCR Digital TV set 254 may process the DTV signal utilizing the DCR DTV SoC 200. The DCR DTV SoC 200 may decrypt the received DTV signal by applying proper content protection operations utilizing the CableCard 202. The CableCard 202 may be pre-configured or configured to apply content protection operations that are specific to a cable-operator. Subsequent to the decryption of the DTV signal, the DCR DTV SoC 200 may process the decrypted signal in order to output the corresponding video and audio components of the received DTV signal.

Figure 3:
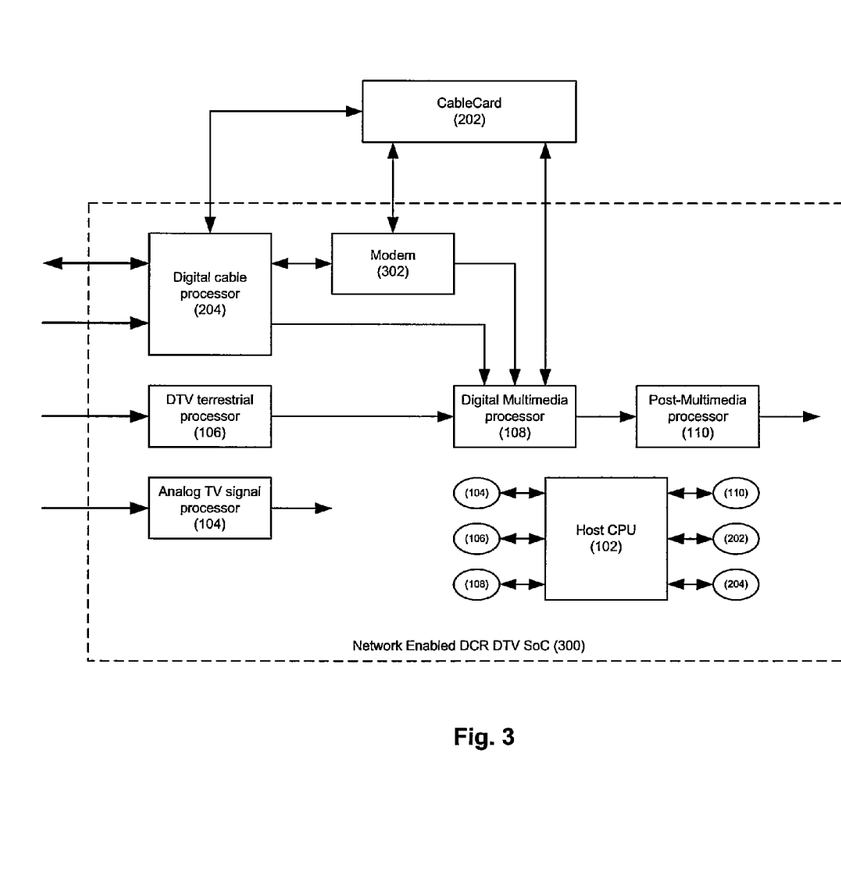
FIG. 3 is a block diagram illustrating an exemplary Network Enabled Digital Cable Ready (DCR) Digital Television (DTV) receiver System-on-Chip (SoC), in connection with an embodiment of the invention.

FIG. 3 is a block diagram illustrating an exemplary Network Enabled Digital Cable Ready (DCR) Digital Television (DTV) receiver System-on-Chip (SoC), in connection with an embodiment of the invention. Referring to FIG. 3, there is shown a DTV SoC 300, a host CPU 102, an analog signal processor 104, a DTV terrestrial processor 106, a digital multimedia processor 108, and a post-multimedia processor 110, a digital cable processor 204, a CableCard 202, and a modem 302.

The DCR DTV SoC 300 may comprise the host CPU 102, the analog signal processor, a DTV terrestrial processor 106, the digital multimedia processor 108, the post-multimedia processor 110, and the digital cable processor 204 as disclosed in FIG. 2A. The DCR DTV SoC 300 may also comprise a modem 302, and suitable logic, circuitry and/or code that may enable reception and processing operations of TV signals. The modem 302 may comprise suitable logic, circuitry and/or code that may enable data transmission and communication services between the DCR DTV SoC 300 and a head-end. This may include for example, DSL service.

In operation, the modem 302 may enable the DCR DTV SoC to establish a data link, a peer-to-peer link for example, with a head-end to facilitate transmission and reception of data communication. The modem 302 may utilize the digital cable processor 204 to perform two-communication with a digital cable head-end. The modem 302 may also utilize the CableCard to decrypt the received signal by applying proper content protection applications. The CableCard 202 may be pre-configured or configured to apply content protection operations that are specific to a cable-operator. The host CPU 102 may additionally configure and control the modem 302. When receiving a TV signal, the DCR DTV SoC 300 may operate as disclosed in FIG. 1A.

Figure 4:
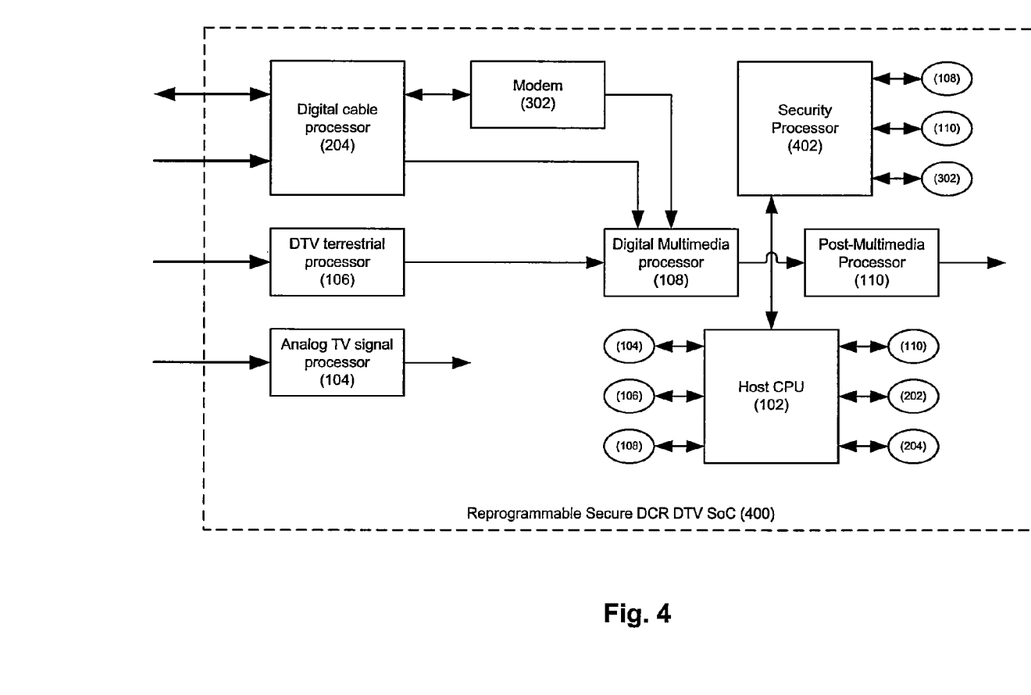
FIG. 4 is a block diagram illustrating an exemplary Secure Reprogrammable Digital Television (DTV) receiver System-on-Chip (SoC), which may be utilized in accordance with an embodiment of the invention.

FIG. 4 is a block diagram illustrating an exemplary Secure Reprogrammable Digital Television (DTV) receiver System-on-Chip (SoC), which may be utilized in accordance with an embodiment of the invention. Referring to FIG. 4, there is shown a DTV SoC 300, a host CPU 102, an analog signal processor 104, a DTV terrestrial processor 106, a digital multimedia processor 108, and a post-multimedia processor 110, a digital cable processor 204, a modem 302, and a security processor 402.

The DCR DTV SoC 400 may comprise the host CPU 102, the analog signal processor, a DTV terrestrial processor 106, the digital multimedia processor 108, the post-multimedia processor 110, and the digital cable processor 204, and the modem 302 as disclosed in FIG. 3. The DCR DTV SoC 400 may also comprise a security processor 402, and suitable logic, circuitry and/or code that may enable reception and processing operations of TV signals. The security processor 402 may comprise suitable logic, circuitry and/or code that may enable performing content protection operations.

In operation, the digital cable processor 204 may process a digital cable signal. The control processor may process the received signal. Where necessary, the digital cable processor 204 may interact with the security processor 402 to decrypt the received signal by applying proper content protection applications. Subsequently, a transport stream may be sent to the digital multimedia processor 108, and the security processor 402 may configure and control the digital multimedia processor 108 and the post-multimedia processor 110 to ensure that the signal may be processed as disclosed in FIG. 3.

The security processor 402 may be configured to apply content protection operations that are specific to a cable-operator. However, the security processor 402 may not be limited to a specific cable-operator, or to a specific content protection operation and/or technology. The security processor 402 may be reprogrammed or configured to perform new content protection operations that are either specific to a new cable-operator, or to a different system. The security processor 402 may enable reprogrammability utilizing the modem 302, and the digital cable processor 204 to establish and perform two-way communication with a digital cable head-end. The security processor 402 may also enable performing the reprogramming in secure manner utilizing a combination of security algorithms and/or other mechanism to ensure authenticity of reprogrammability. For example, the security processor 402 my use a symmetric security algorithm, for example AES-based algorithm, or an asymmetric security algorithm, for example, RSA-based algorithm. The security processor 402 my use other mechanism to further improve security during reprogrammability including, but not limited, use of chip-specific identification information. The security processor 402 may store security-related information internally to further improve security during said reprogrammability. This security-related information may comprise, for example, the chip-specific identification information and/or keys, signatures, and similar information necessary for use of a security algorithm.

Figure 5:
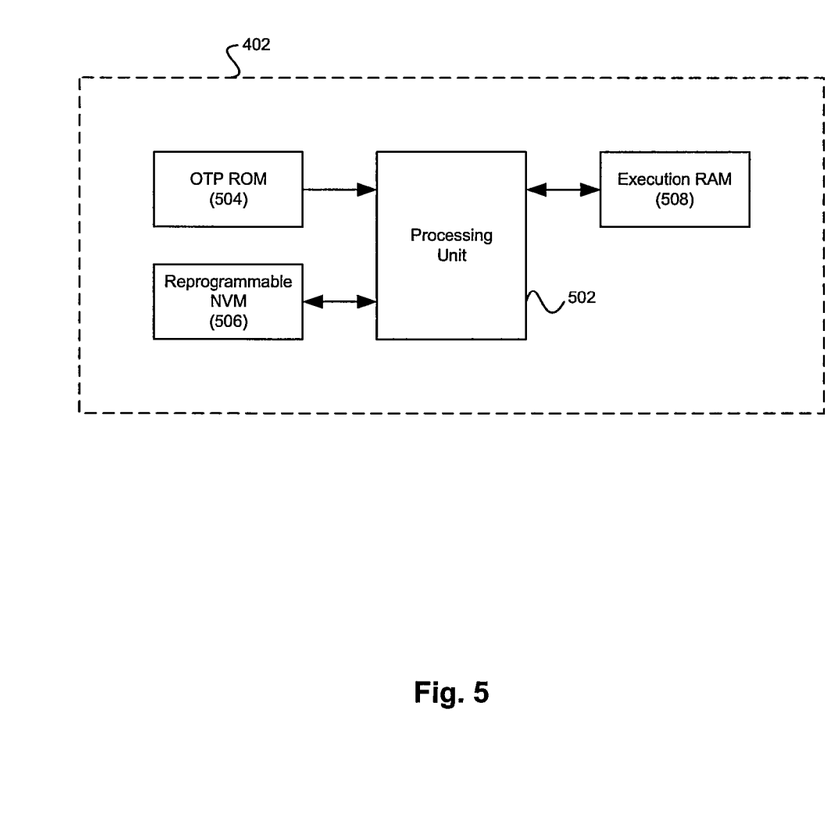
FIG. 5 is a block diagram illustrating an exemplary security processor, which may be utilized in accordance with an embodiment of the invention.

FIG. 5 is a block diagram illustrating an exemplary security processor, which may be utilized in accordance with an embodiment of the invention. Referring to FIG. 4, there is shown a security processor 402, a processing unit 502, a one-time programmable random-access memory (OTP ROM) 504, a reprogrammable non-volatile memory (reprogrammable NVM) 506, and an execution random access memory (Execution RAM) 508.

The security processor 402 may comprise the processing unit 502, the one-time programmable random-access memory (OTP ROM) 504, the reprogrammable non-volatile memory (reprogrammable NVM) 506, the execution random access memory (Execution RAM) 508 and suitable logic, circuitry and/or code that may enable performing operations such as content protection operations and/or reprogramming functions as disclosed in FIG. 4.

The processing unit 502 may comprise suitable logic, circuitry and/or code that may enable performing operations that enable performing content protection operations and reprogrammability functions. The OTP ROM 504 may comprise suitable logic, circuitry and/or code that may enable one-time programming of data and/or code that may be read and used by the processing unit 502 during two-stage code reprogramming. The reprogrammable NVM 506 may comprise suitable logic, circuitry and/or code that may non-permanent but secure storage and use of date and/or code by processing unit 502 during content protection and reprogrammability operations. The execution RAM 508 may comprise suitable logic, circuitry and/or code that may enable non-permanent storage and use of date and/or code used by processing unit 502 during content protection and reprogrammability operations.

In operation, the processing unit 502 may perform security processor 402 operations. The processing unit may utilize the execution RAM 508 to ensure secure operability independent of the host CPU 102, especially during reprogramming of DCR DTV SoC 400. The processing unit 502 may utilize the reprogrammable NVM 508 to load and store code and/or data utilize to perform content protection operations. The data and/or code in reprogrammable NVM 508 may be reprogrammed during reprogrammability of DCR DTV SoC 400. The OTP ROM 504 may be utilized to store permanent data and/or code that may be read and used during such operations as reprogrammability of DCR DTV SoC 400. For example, the OTP ROM 504 may be utilized to store such information as, for example, chip-specific identification information. In an exemplary reprogramming scenario, the processing unit 502 may fetch data and/or code stored in the OTP ROM to use that information for authentication purpose to improve security of reprogrammability of DCR DTV SoC 400.

Figure 6:
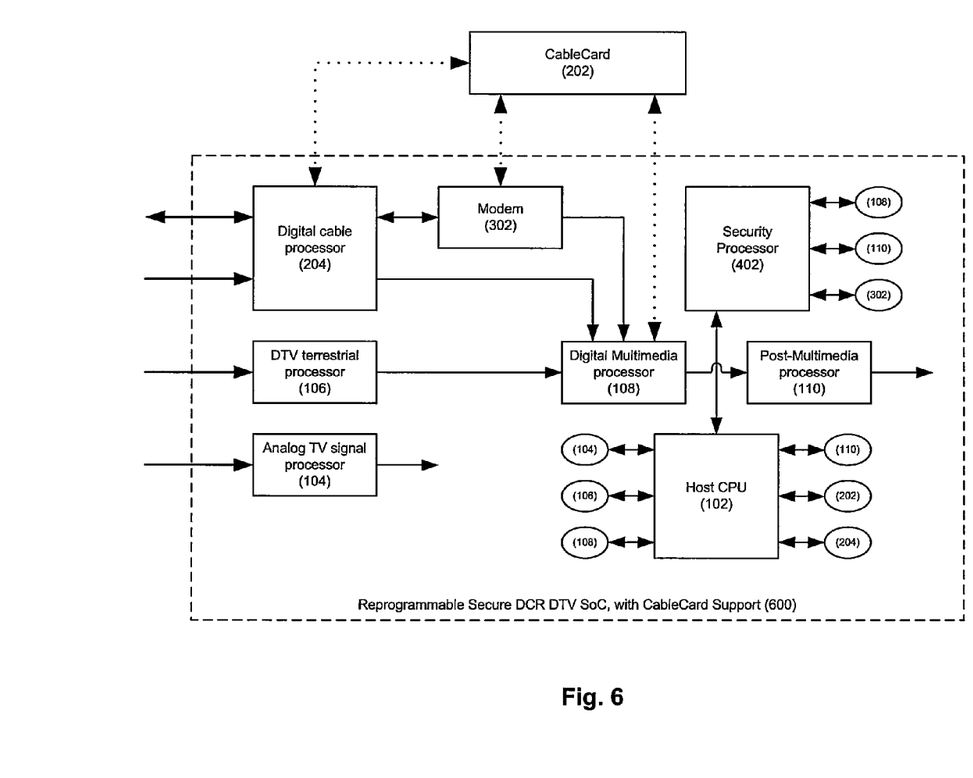
FIG. 6 is a block diagram illustrating an exemplary Secure Reprogrammable Digital Television (DTV) receiver System-on-Chip (SoC) with CableCard Support, which may be utilized in accordance with an embodiment of the invention.

FIG. 6 is a block diagram illustrating an exemplary Secure Reprogrammable Digital Television (DTV) receiver System-on-Chip (SoC) with CableCard Support, which may be utilized in accordance with an embodiment of the invention. Referring to FIG. 6, there is shown a DCR DTV SoC 600, a host CPU 102, an analog signal processor 104, a DTV terrestrial processor 106, a digital multimedia processor 108, and a post-multimedia processor 110, a digital cable processor 204, a CableCard 202, a modem 302, and a security processor 402.

The DCR DTV SoC 600 may comprise the host CPU 102, the analog signal processor, a DTV terrestrial processor 106, the digital multimedia processor 108, the post-multimedia processor 110, and the digital cable processor 204, the modem 302, and the security processor 402 as disclosed in FIG. 4. The DCR DTV SoC 600 may also comprise suitable logic, circuitry, and/or code that may enable the DCR DTV SoC 600 to utilize a CableCard 202.

In operation, in the event that the security processor 402 is disabled, the DCR DTV SoC 600 may be enabled to utilize CableCard 202 to operate as disclosed in FIG. 3.

Figure 7:
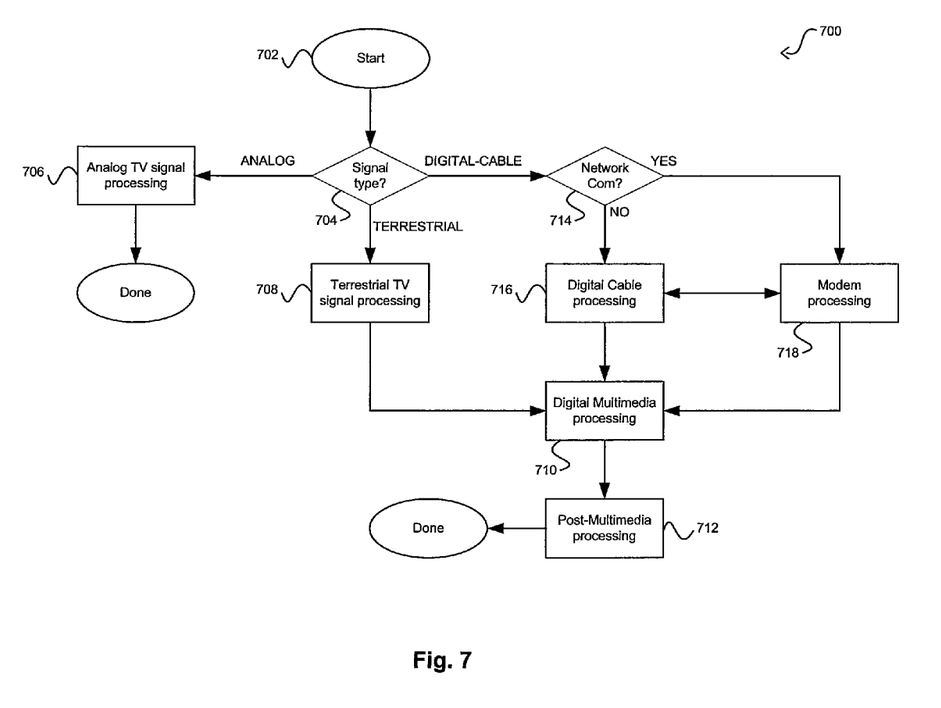
FIG. 7 is a flow diagram that illustrates an exemplary system that performs TV signal processing, which may be utilized in accordance with an embodiment of the invention.

FIG. 7 is a flow diagram that illustrates an exemplary system that performs TV signal processing, which may utilized in accordance with an embodiment of the invention. Referring to FIG. 7, there is shown flow chart 700. In step 702, a TV signal is received. In step 704, a determination of the type of signal is performed. In instances when the outcome of the determination of the type of signal received is ANALOG, the process may proceed to step 706. In step 706, an analog TV signal processing may be performed. This may comprise performing demodulation, and A/D (analog/digital) conversion, decoding composite video to digital components, BTSC stereo decoding, and other types of operations specific to some analog TV signal including, but not limited to, NTSC or PAL signals.

Returning to step 704, the determination of the type of signal received is TERRESTRIAL, the process may proceed to step 708. In step 708, a terrestrial TV signal processing is performed. This may include, but is not limited to, performing such operations as RF conversion, signal demodulation, de-interleaving, decoding, an other operations, according to pre-determined standard such as, for example, VSB and ATSC. In step 710, a digital multimedia processing is performed. This may comprise extracting the digital and audio content of the digital transport stream and perform necessary decoding processing on the video and/or audio content of the digital transport stream. This may include, but is not limited to, performing digital transport processing and may comprise for example MPEG-2 multimedia processing, MPEG-2 video decoder, Dolby Digital (AC3) decoder. In step 712, post-multimedia processing may be performed. This may comprise performing digital audio and video processing to facilitate suitable output signals within a Digital TV set.

Returning to step 704, when the determination of the type of signal received is DIGITAL-CABLE, the process may proceed to step 714. In step 714, a determination of whether a network communication is sent may be performed. In instances when it may be determined that no network communication is sent, the process may proceed to step 716. In step 716, digital cable processing may be performed. This may comprise performing one-way and/or two-way communication with cable-TV head-end 150. This may also comprise application of necessary conditional access information. The security processor 402 may comprise information necessary to performing such conditional access functions. When this step is complete, the process may proceed to step 710.

Returning to step 714, in instances when it may be determined that network communication is sent, the process may proceed to step 718. In step 718, modem processing may be performed. This may comprise performing data transmission and communication services including, but limited to, DSL services. Step 718 may comprise performing digital cable processing as described in step 716. When this step 718 complete, the process may proceed to step 710.

Figure 8:
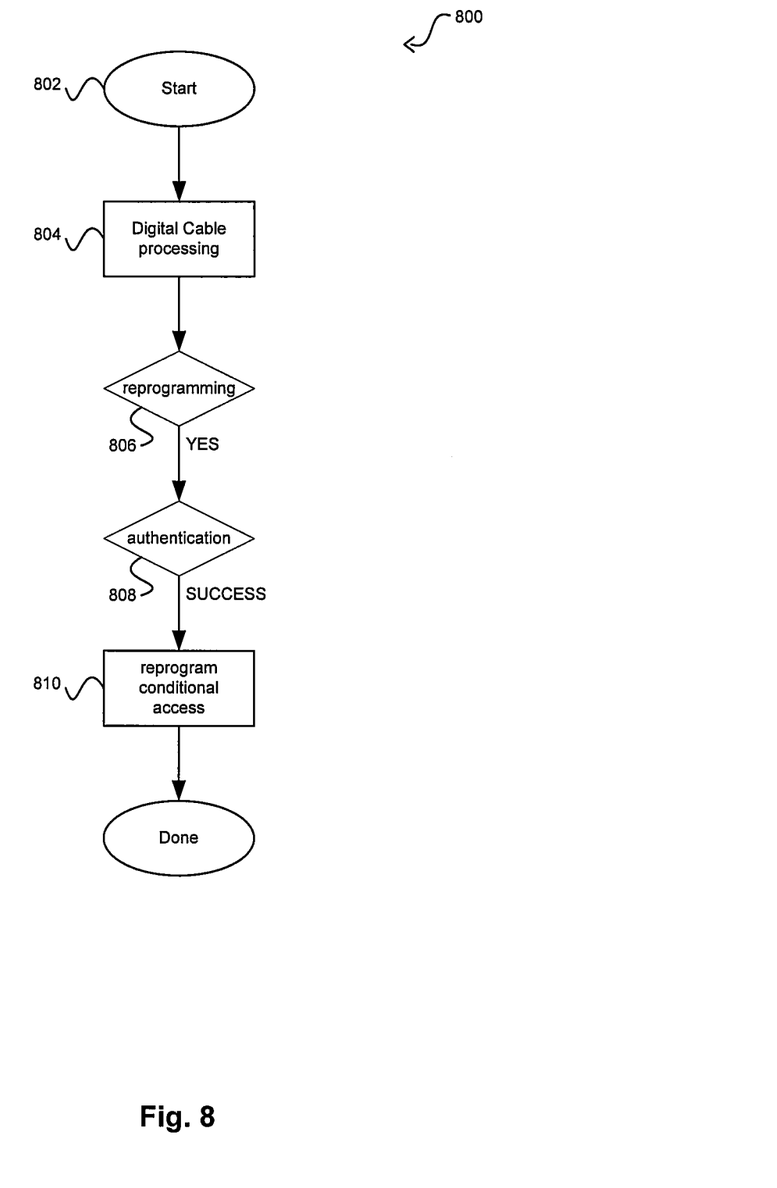
FIG. 8 is a flow diagram that illustrates an exemplary system that performs conditional access reprogramming, which may be utilized in accordance with an embodiment of the invention.

FIG. 8 is a flow diagram that illustrates an exemplary system that performs conditional access reprogramming, which may utilized in accordance with an embodiment of the invention. Referring to FIG. 8, there is shown flow chart 800. In step 802, a digital cable signal may be received. In step 804, digital cable processing may be performed. This may comprise performing one-way and/or two-way communication with cable-TV head-end 150. In step 806, a determination whether a reprogramming command is sent may be performed. In instances when the determination whether a reprogramming command was sent is YES, the process may proceed to step 808. In step 808, an authentication of the reprogramming command may be performed. This may comprise use of hardware-based authentication, including for example, use of chip-specific identification information, wherein information stored within the secure reprogrammable processor may be compared against information included in the transmission. Authentication may also comprise use of security algorithm, including for example a symmetric security algorithm such as AES-based algorithm, and/or an asymmetric security algorithm such as RSA-based algorithm. In instances when the outcome of the authentication of the reprogramming command is SUCCESS, the process may proceed to step 810. In step 810, a conditional access reprogramming may be performed. This may comprise storing new information in the reprogrammable NVM 506 to enable the security processor 402 to perform modified and/or new condition access information.

Figure 9:
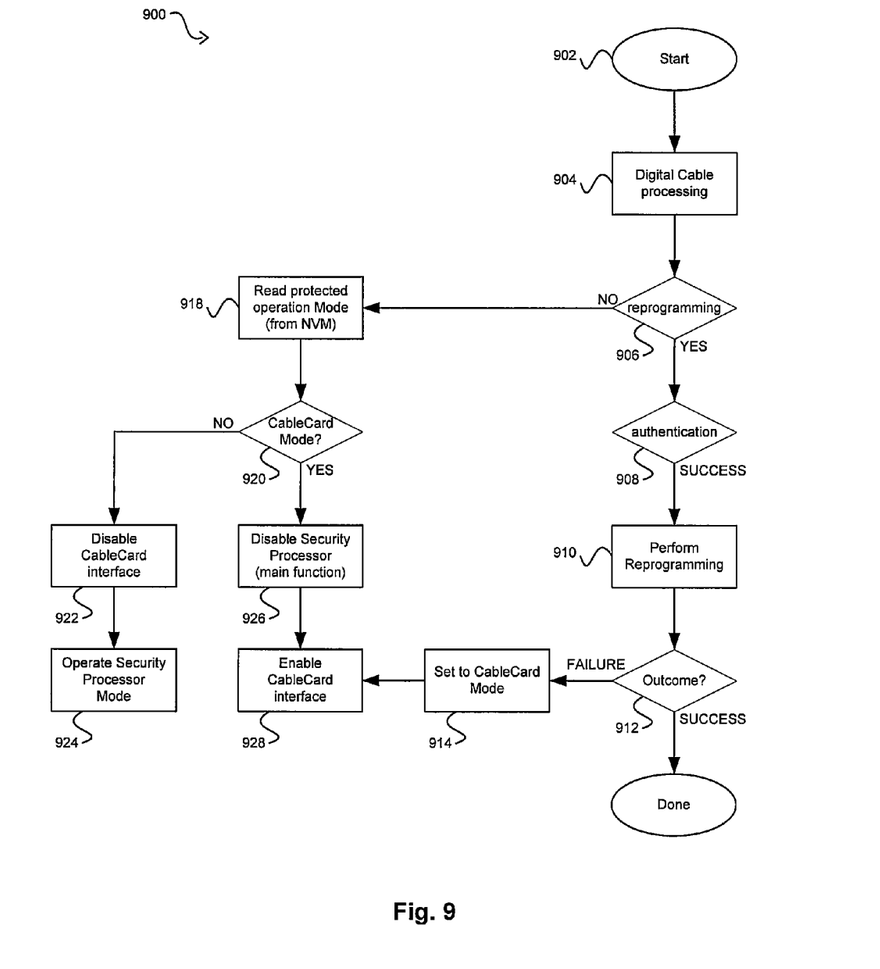
FIG. 9 is a flow diagram that illustrates an exemplary system with security processor and a CableCard that performs conditional access procedures, which may utilized in accordance with an embodiment of the invention.

FIG. 9 is a flow diagram that illustrates an exemplary system with security processor and a CableCard that performs conditional access procedures, which may utilized in accordance with an embodiment of the invention. Referring to FIG. 9, there is shown a flow chart 900. In step 902, a digital cable signal may be received. In step 904, digital cable processing may be performed. This may comprise performing one-way and/or two-way communication with cable-TV head-end 150. In step 906, a determination whether a reprogramming command is sent may be performed. In instances when the determination whether a reprogramming command was sent is YES, the process may proceed to step 908. In step 908, an authentication of the reprogramming command may be performed. This may comprise use of hardware-based authentication, including for example, use of chip-specific identification information, wherein information stored within the secure reprogrammable processor may be compared against information included in the transmission. Authentication may also comprise use of security algorithm, including for example a symmetric security algorithm such as AES-based algorithm, and/or an asymmetric security algorithm such as RSA-based algorithm. In instances when the outcome of the authentication of the reprogramming command is SUCCESS, the process may proceed to step 910. In step 910, a conditional access reprogramming may be performed. This may comprise storing new information in the reprogrammable NVM 506 to enable the security processor 402 to perform modified and/or new condition access information. In step 912, the outcome of the reprogramming procedure is determined. In instances the outcome is SUCCESS, the process is DONE.

Returning to step 912, in instances when the outcome is FAILURE, the process may proceed to step 914. In step 914, the system sets to CableCard mode and the security processor is disabled. In step 928 the CableCard interface is CableCard interface is enabled; components of the SoC may interact with the CableCard while performing conditional access procedures.

Returning to step 906, in instances when the determination whether a reprogramming command was sent is NO, the process may proceed to step 918. In step 918, Protected Operation mode is initiated by reading the operation mode of system stored in the reprogrammable NVM 506. In step 920 a determination whether the system is in CableCard mode is made. In instances when the determination the system is in CableCard mode is NO, the process may proceed to step 922. In step 922, the CableCard interface is disabled; components of the SoC may not interact with the CableCard while performing conditional access procedures. In step 924, the SoC initiate performing conditional access procedures utilizing the security processor.

Returning to step 920, in instances when the determination the system is in CableCard mode is YES, the process may proceed to step 926. In step 926, the security processor is disabled, and the process proceeds to step 928; as described above.

Various embodiments of the invention may comprise a method and system for performing content protection operations pertaining to digital cable-TV signal processing within a digital cable ready (DCR) digital TV (DTV) system-on-chip. An embedded security processor 402 may be used to perform operations that are currently performed by an external entity, such as, for an example, a CableCard. The security processor 402 may be reprogrammable to enable the system-on-chip to be reconfigured with a different content protection function and/or to allow compatibility with a new cable service provider. The security processor 402 may enable secure reprogrammability of the system-on-chip utilizing security algorithms and/or other mechanism. The security processor may internal store information that is necessary to enable secure reprogrammability of the system-on-chip. The system-on-chip may be enabled to operate with a CableCard whenever the security processor may be disabled.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A signal processing method, comprising:
   in a receiver system-on-chip (SoC), wherein said receiver SoC comprises an embedded programmable security processor and said receiver SoC is configured to support one or more external security modules:
   receiving one or more commands to enable reprogramming of said embedded programmable security processor to handle a conditional access function;
   configuring, by said embedded programmable security processor, said receiver SoC to support said conditional access function based on said received one or more commands;
   disabling said embedded programmable security processor if said configuring fails; and
   utilizing at least one of said one or more external security modules during a conditional access operation when said embedded programmable security processor is disabled.

2. The method according to claim 1, wherein said conditional access function is a Cablelabs® Downloadable Conditional Access System (DCAS) function.

3. The method according to claim 1, wherein said configuring comprises:
   securely configuring said receiver SoC utilizing chip-specific identification information.

4. The method according to claim 3, further comprising:
   storing said chip-specific identification information within said embedded programmable security processor.

5. The method according to claim 1, wherein said configuring comprises:
   securely configuring said receiver SoC utilizing a security algorithm.

6. The method according to claim 5, wherein said security algorithm comprises an asymmetric security algorithm.

7. The method according to claim 6, wherein said asymmetric security algorithm comprises a RSA-based algorithm.

8. The method according to claim 5, wherein said security algorithm comprises a symmetric security algorithm.

9. The method according to claim 4, wherein said symmetric security algorithm comprises an AES-based algorithm.

10. The method according to claim 1, wherein said utilizing comprises:
    operating said receiver SoC with a Cable and when said embedded programmable security processor is disabled.

11. A non-transitory machine-readable storage having stored thereon, a computer program having at least one code section for handling processing of signals, the at least one code section being executable by a machine to cause the machine to perform a method, the method comprising:
    in a receiver system-on-chip (SoC), wherein said receiver SoC comprises an embedded programmable security processor and said receiver SoC is configured to support one or more external security modules:
    receiving one or more commands to enable reprogramming of said embedded
    programmable security processor to handle a conditional access function:
    configuring, by said embedded programmable security processor, said receiver SoC to support said conditional access function based on said received one or more commands;
    disabling said embedded programmable security processor if said configuring fails; and
    utilizing at least one of said one or more external security modules during a conditional access operation when said embedded programmable security processor is disabled.

12. The non-transitory machine-readable storage according to claim 11, wherein said conditional access function is a Cablelabs® Downloadable Conditional Access System (DCAS) function.

13. The non-transitory machine-readable storage according to claim 11, wherein said configuring comprises:
securely configuring said receiver SoC utilizing chip-specific identification information.

14. The non-transitory machine-readable storage according to claim 13, further comprising:
storing said chip-specific identification information within said embedded programmable security processor.

15. The non-transitory machine-readable storage according to claim 11, wherein said configuring comprises:
securely configuring said receiver SoC utilizing a security algorithm.

16. The non-transitory machine-readable storage according to claim 15, wherein said security algorithm comprises an asymmetric security algorithm.

17. The non-transitory machine-readable storage according to claim 16, wherein said asymmetric security algorithm comprises a RSA-based algorithm.

18. The non-transitory machine-readable storage according to claim 15, wherein said security algorithm comprises a symmetric security algorithm.

19. The non-transitory machine-readable storage according to claim 18, wherein said symmetric security algorithm comprises an AES-based algorithm.

20. The non-transitory machine-readable storage according to claim 11, wherein said utilizing comprises:
operating said receiver SoC with a CableCard when said embedded programmable security processor is disabled.

21. A system for handling processing of signals, the system comprising:
one or more circuits in a receiver system-on-chip (SoC), wherein said receiver SoC comprises an embedded programmable security processor and said receiver SoC is configured to support one or more external security modules, wherein:
said one or more circuits are configured to receive one or more commands to enable reprogramming of said embedded programmable security processor to handle a conditional access function:
said one or more circuits are configured to configure, via said embedded programmable security processor, said receiver SoC to support said conditional access function based on said received one or more commands; and
said one or more circuits are configured to disable said embedded programmable security processor if said configuring fails and to utilize at least one of said one or more external security modules during a conditional access operation when said embedded programmable security processor is disabled.

22. The system according to claim 21, wherein said conditional access function is a Cablelabs® Downloadable Conditional Access System (DCAS) function.

23. The system according to claim 21, wherein said one or more circuits are configured to securely configure said receiver SoC utilizing chip-specific identification information.

24. The system according to claim 23, wherein said one or more circuits are further configured to store said chip-specific identification information within said embedded programmable security processor.

25. The system according to claim 21, wherein said one or more circuits are configured to securely configure said receiver SoC utilizing a security algorithm.

26. The system according to claim 25, wherein said security algorithm comprises an asymmetric security algorithm.

27. The system according to claim 26, wherein said asymmetric security algorithm comprises a RSA-based algorithm.

28. The system according to claim 25, wherein said security algorithm comprises a symmetric security algorithm.

29. The system according to claim 28, wherein said symmetric security algorithm comprises an AES-based algorithm.

30. The system according to claim 21, wherein said one or more circuits are configured to enable operation of said receiver SoC with a CableCard when said embedded programmable security processor is disabled.

31. The method according to claim 1, wherein said receiving comprises:
receiving said one or more commands from a remote entity.

32. The non-transitory machine-readable storage according to claim 11, wherein said receiving comprises:
receiving said one or more commands from a remote entity.

33. The system according to claim 21 wherein said one or more circuits are configured to receive said one or more commands from a remote entity.

34. The method according to claim 1, wherein said receiver SoC is a Digital Television (DTV) receiver.

35. The method according to claim 1, wherein said conditional access function comprises:
a new conditional access function; or
a modified existing conditional access function.

36. The non-transitory machine-readable storage according to claim 11, wherein said receiver SoC is a Digital Television (DTV) receiver.

37. The non-transitory machine-readable storage according to claim 11, wherein said conditional access function comprises:
a new conditional access function; or
a modified existing conditional access function.

38. The system according to claim 21, wherein said receiver SoC is a Digital Television (DTV) receiver.

39. The system according to claim 21, wherein said conditional access function comprises:
a new conditional access function; or
a modified existing conditional access function.

* * * * *